(12) United States Patent
Campagna et al.

(10) Patent No.: US 7,359,509 B2
(45) Date of Patent: *Apr. 15, 2008

(54) METHOD AND SYSTEM FOR GENERATION OF CRYPTOGRAPHIC KEYS AND THE LIKE

(75) Inventors: Matthew J. Campagna, Ridgefield, CT (US); Yiqun Yin, Riverside, CT (US)

(73) Assignee: Pitney Bowes Inc., Stamford, CT (US)

( * ) Notice: Subject to any disclaimer, the term of this patent is extended or adjusted under 35 U.S.C. 154(b) by 525 days.

This patent is subject to a terminal disclaimer.

(21) Appl. No.: 11/000,852

(22) Filed: Dec. 1, 2004

(65) Prior Publication Data

US 2006/0126842 A1 Jun. 15, 2006

(51) Int. Cl.
*H04L 9/00* (2006.01)

(52) U.S. Cl. .................. 380/46; 380/44; 380/258; 708/250; 708/254

(58) Field of Classification Search ............ 380/258, 380/44, 46; 708/250, 254
See application file for complete search history.

(56) References Cited

U.S. PATENT DOCUMENTS

| | | | | |
|---|---|---|---|---|
| 5,297,207 A * | 3/1994 | Degele | | 380/46 |
| 6,141,668 A * | 10/2000 | Shimada | | 708/250 |
| 6,301,362 B1* | 10/2001 | Matyas et al. | | 380/37 |
| 7,007,050 B2* | 2/2006 | Saarinen | | 708/250 |
| 7,227,951 B2* | 6/2007 | Desai et al. | | 380/46 |
| 7,269,736 B2* | 9/2007 | Howard et al. | | 713/179 |
| 2002/0090085 A1* | 7/2002 | Vanstone et al. | | 380/44 |
| 2004/0162864 A1* | 8/2004 | Nowshadi et al. | | 708/254 |
| 2005/0055391 A1* | 3/2005 | Carlson et al. | | 708/250 |
| 2006/0153376 A1* | 7/2006 | Desai et al. | | 380/46 |

\* cited by examiner

*Primary Examiner*—Nasser Moazzami
*Assistant Examiner*—Shanto M. Z. Abedin
(74) *Attorney, Agent, or Firm*—Brian A. Lemm; Angelo N. Chaclas

(57) ABSTRACT

A method, and deterministic random bit generator system operating in accordance with the method, for generating cryptographic keys and similar secret cryptographic inputs which are hard to guess. A seed is input from an entropy source; and an initial state is generated as a function of the seed. When a request to generate a cryptographic key is received a current state, where the current state is initially the initial state, is mixed to generate an out put string and a next state and the current state is set to the next state. The requested cryptographic key is generated from the string; and output. These steps can be repeated to generate successive output strings with assurance of forward and backward secrecy. An encryption system including such a generator is also disclosed.

4 Claims, 4 Drawing Sheets

METHOD AND SYSTEM FOR GENERATION OF CRYPTOGRAPHIC KEYS AND THE LIKE

BACKGROUND OF THE INVENTION

The subject invention relates to a method and system for generating secret inputs, such as keys, to a cryptographic system. More particularly it relates to a method and system for generating inputs, typically in the form of binary strings, which are "hard" to guess. By "hard" herein is meant that given realistic computational resources a secret input cannot be discovered, given less than all the inputs used to create the secret input, in less than exponential time. Still more particularly it relates to a method and system for generating keys for digital postage meters that rely on cryptographic techniques to create secure, digitally printed postal indicia.

Encryption, Digital Signature algorithms, and Key Agreement Protocols and similar cryptographic systems rely on two basic assumptions to keep information secure:

1. The algorithms used are sound, and cannot be attacked directly. That means you cannot derive information about inputs to the algorithm that you did not know before hand; nor can you derive the output of the algorithm unless you know all the inputs.

2. Any secret input of the algorithm is hard to guess. Typically secret inputs are inputs such as: a secret key, a random value used for "blocking" (i.e. used to hide other information), or the private portion of a public key pair. As used herein the terms "key" or "cryptographic key" are meant to include any string of random bits for cryptographic applications, such as a secret input or a hard to guess value from which a secret input is derived; e.g. a hard to guess value from which a public/private key pair is derived; as well as strings used in applications where the random bits become known and still strong security of the Deterministic Random Bit Generator (DRBG) is required.

Methods and systems such as that of the present invention (hereinafter sometimes "Deterministic Random Bit Generators" or "DRBG's") are used to satisfy this second assumption, and are used throughout standard cryptographic protocols and operations such as: SSL/TLS Secure Sockets Layer Protocol, DSA—Digital Signature Algorithm, Diffie-Hellman Key Exchanges, RSA Encryption and Signing Algorithms, etc. DRBG's provide the basic hard to guess inputs to such cryptographic operations. Typically DRBG's include an initialization routine to generate an initial state variable, a generation routine to generate a requested secret input, and can include a reseed routine to recover security properties in the event the DRBG is compromised.

The current family of ANSI (American National Standards Institute) approved DRBG's (based on DES and SHA1 standards) are aging in the sense of being antiquated by newer algorithms and stronger security requirements. In fact DES is broken in the sense that a sub-exponential algorithm to break it is known.

Current security specifications for AES and ECC provide security that require on the order of $2^{256}$ computational operations to break an algorithm. However, the present inventors are not aware of DRBG's that adequately provide that level of security; which reduces the security of algorithms using DRBG's because the second assumption discussed above is not fully satisfied at the strength of the algorithm. That is, while it may require $2^{256}$ operations work to break the algorithm, it may only require $2^{56}$ operations to discover the secret key used; which would then reduce overall security to $2^{56}$ operations (in most cases).

It is also advantageous to provide a DRBG having a consistent, or "flat", forward secrecy profile and backward secrecy, against all known state assumptions. Backward secrecy is the property that even with knowledge of the current state of the DRBG it remains hard to determine previous components of the state. A flat forward secrecy profile is the property that even with any (less than complete) knowledge of the current state it remains hard to predict future output of the DRBG, or future unknown components of the state.

Thus it is an object of the subject invention to provide a method and system for generating secret inputs which provides increased levels of security for cryptographic systems, and which has the properties of a flat forward secrecy profile and backwards secrecy.

BRIEF SUMMARY OF THE INVENTION

The above object is achieved and the disadvantages of the prior art are overcome in accordance with the subject invention by a method, and system operating in accordance with the method, for generating a cryptographic key which is hard to guess, by inputting a seed from an entropy source; generating an initial state as a function of said seed; receiving a request to generate a cryptographic key; mixing a current state, using a hash function, where said current state is initially said initial state, to generate an output string and a next state; then setting said current state to said next state, whereby mixing a current state and setting the current state to the next state can be repeated to generate successive output strings; and deriving said requested cryptographic key from at least one of the output strings.

As used herein "mixing" a set of values means generating an output as a function of all the values where the function has the property that it is hard (as "hard" is defined herein) to determine the output, or to recover the set of values from the output, with less than full knowledge of the set.

In accordance with one aspect of the subject invention said output string is specified to be n bits in length and said state is mixed m times, each time generating a substring HASH_DIGESTSIZE bits in length, where m times HASH_DIGESTSIZE is greater than or equal to n, and said output string is chosen to be n predetermined bits of a concatenation of said substrings, and where HASH_DIGESTSIZE is said hash function's output bit length.

In accordance with another aspect of the subject invention said initial state is generated by determining a seed s, said seed s having 2*k bits of entropy; computing said initial state $S_0$ as hash function hash(s); and outputting an initial state $S_0$.

In accordance with another aspect of the subject invention said current state $S_j$ is mixed to generate an output string $y_j$ and a next state $S_{j+1}$ by determining said state $S_j$; determining a length n for said output string, and a parameter HASH_DIGESTSIZE; setting an integer value m equal to the smallest integer greater than length n divided by HASH_DIGESTSIZE; if a user input $u_j$ is supplied, computing a variable V as a hash($u_j|S_j$), and otherwise computing said variable V as a hash($S_j$); setting an index q equal to 1; computing a variable x as a hash function x=hash(V); setting a variable $w_q$ equal to said variable x; computing said variable V as a function V=V+1(mod $2^{HASH\_DIGESTSIZE}$); setting said index q equal to q+1; if said index q is not equal to m+1, returning to compute a variable x as a hash function hash(V); otherwise computing said output string $y_j$ as n predetermined bits of a concatenation of variables $w_q$, where q equals 1 to m; and computing a next state $S_{j+1}$ as a hash function $S_{j+1}=\text{hash}(V+y_j+1(\text{mod } 2^{HASH\_DIGESTSIZE}))$.

Other objects and advantages of the subject invention will be apparent to those skilled in the art from consideration of the detailed description set forth below and the attached drawings.

DETAILED DESCRIPTION OF PREFERRED EMBODIMENTS OF THE INVENTION

Figure 1:
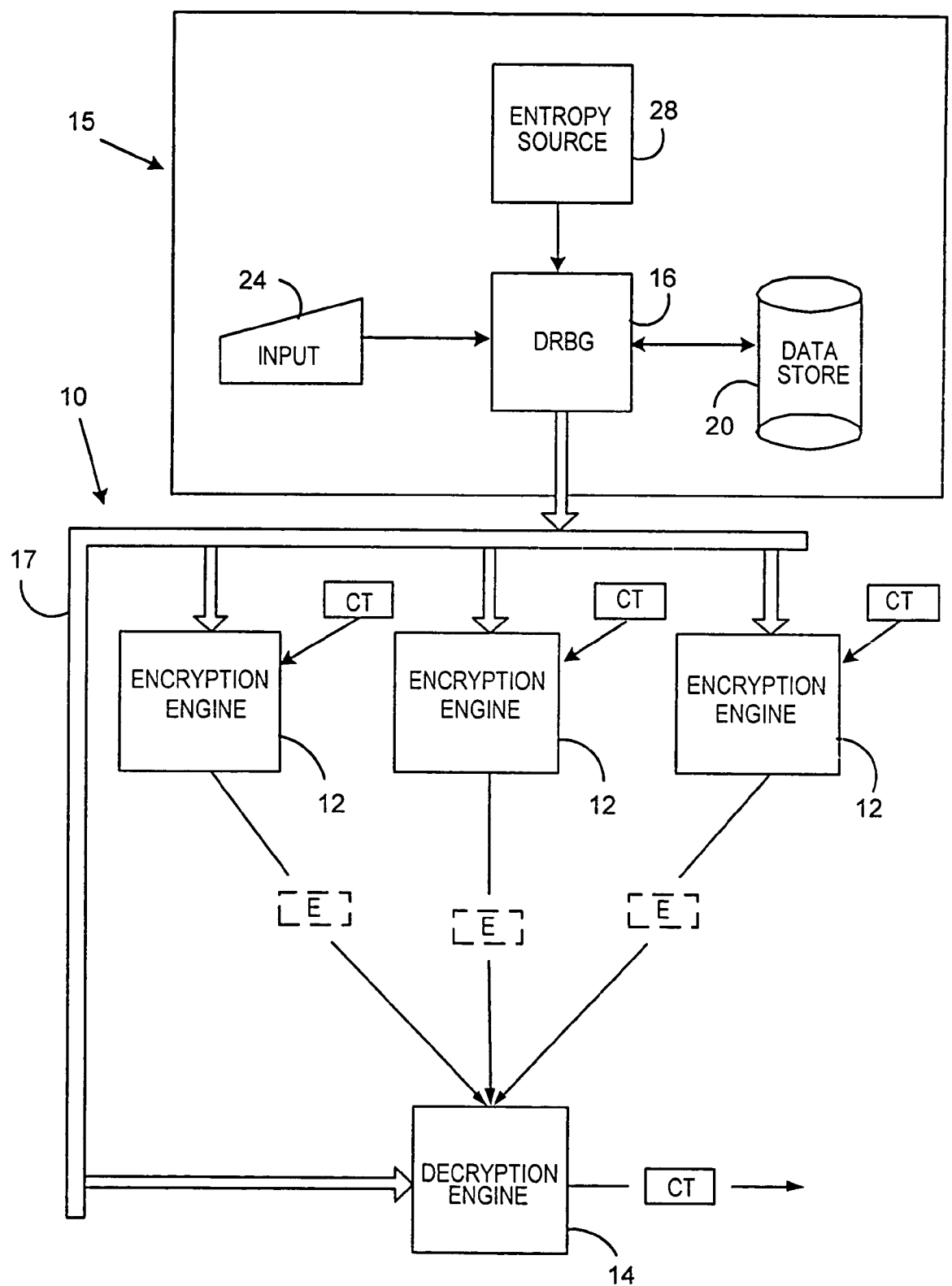
FIG. 1 shows a schematic block diagram of an encryption system comprising a DRBG in accordance with the subject invention.

In FIG. 1 system 10 is a generalized encryption system. Encryption engines 12 receive clear text messages CT and combine them with a secret input (hereinafter sometimes a "key" or "cryptographic key" or "encryption key") in accordance with an encryption standard such as the symmetric key standard, DES; or the public key standard, RSA to generate encryptions E. The encryptions are then sent to decryption engine 14 in any convenient manner where they are decrypted using the appropriate decryption key (which can be the same as the encryption key or may be part of an encryption/decryption key pair) to recover messages CT for further distribution. (Only one engine 14 is shown for simplicity of illustration.) Without knowledge of the keys used it is hard to recover messages CT (or at least more costly than the value of the information obtained would justify). System 10 can also carry out other cryptographic operations such as digital signing of messages in a substantially similar manner. In a preferred embodiment of the subject invention encryption engines 12 are digital postage meters such as those marketed by the assignee of the present patent application which use cryptographic techniques to authenticate digitally printed postal indicia and decryption engine 14 is incorporated in postal service mail handling systems to validate the indicia on mail pieces printed by the meters.

History shows, however, that in time any secret can be learned. System 10 therefore includes key generation system 15 for generating new keys from time to time as necessary. The new keys must, of course, be distributed to engines 12 and 14 in a secure manner through secure communications link 17. This can be done in any convenient manner, details of which form no part of the subject invention. System 15 includes DRBG 16 (which is typically implemented as an application run on a programmed data processing system), data store 20 for storing algorithms and constants used to generate keys, input 24 for input of various parameters used to specify the keys to be generated, and entropy source 28 for generating seed values used to initialize or reseed DRBG 16 as will be described further below.

Entropy source 28 is a conventional apparatus that generates random output values based on measurement of physical phenomena. Typically entropy sources are based on apparatus such as ring oscillators, pluralities of high speed clocks and the drift among them, radioactive decay, and keystroke timing. While such entropy generators do produce numbers which are random in the sense that they are practically unpredictable, or in the case of radioactive decay truly unpredictable, they have proven to be unsatisfactory for directly generating keys for two reasons: the output is not flat, i.e. all output values are not equally likely; and known entropy sources are too slow to generate the large number of keys needed for large cryptographic systems.

Figure 2A:
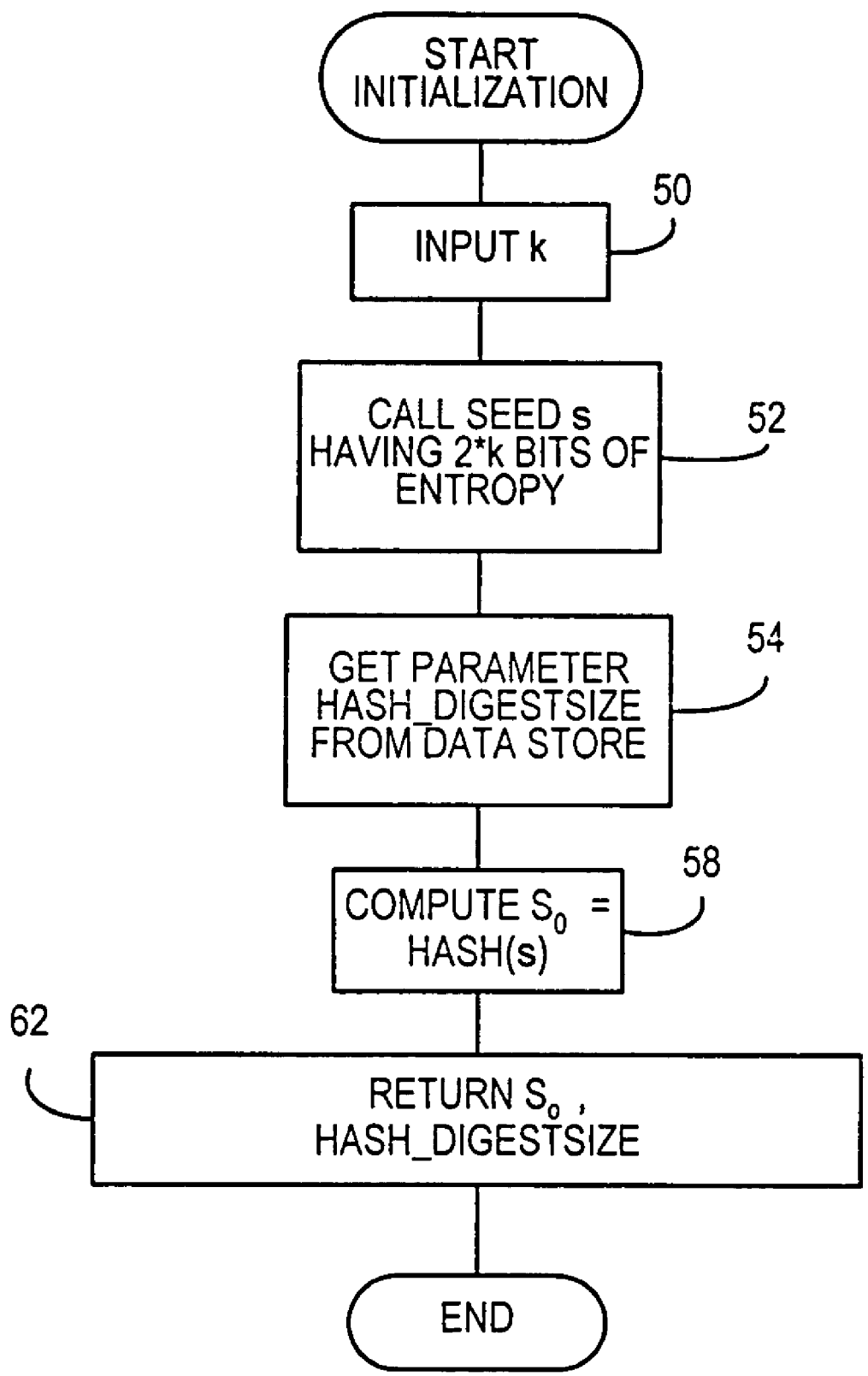
FIGS. 2a, 2b, and 2c show a flow diagram of a hash function based method for generating a cryptographic key.
Figure 2B:
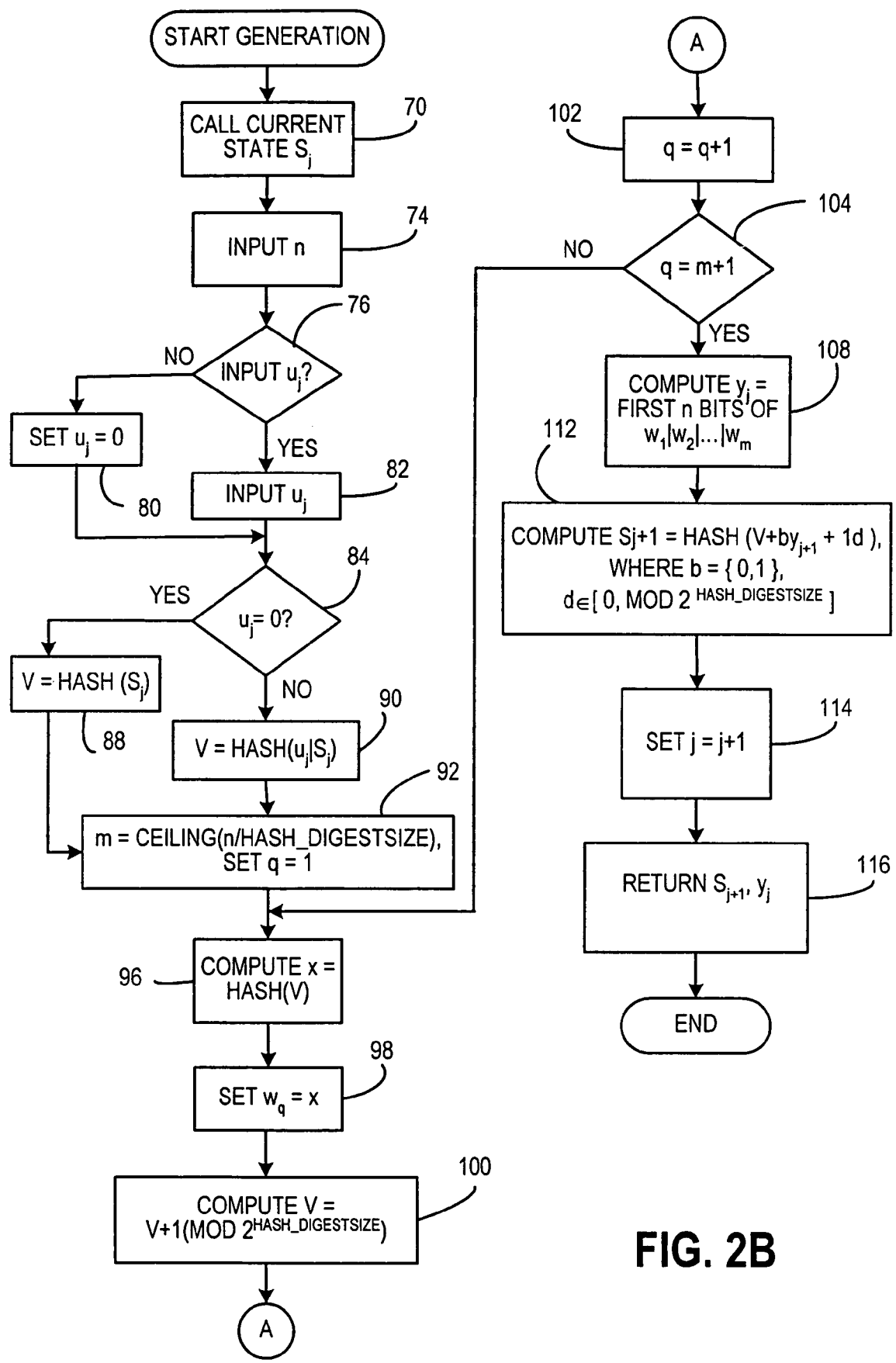
Figure 2C:
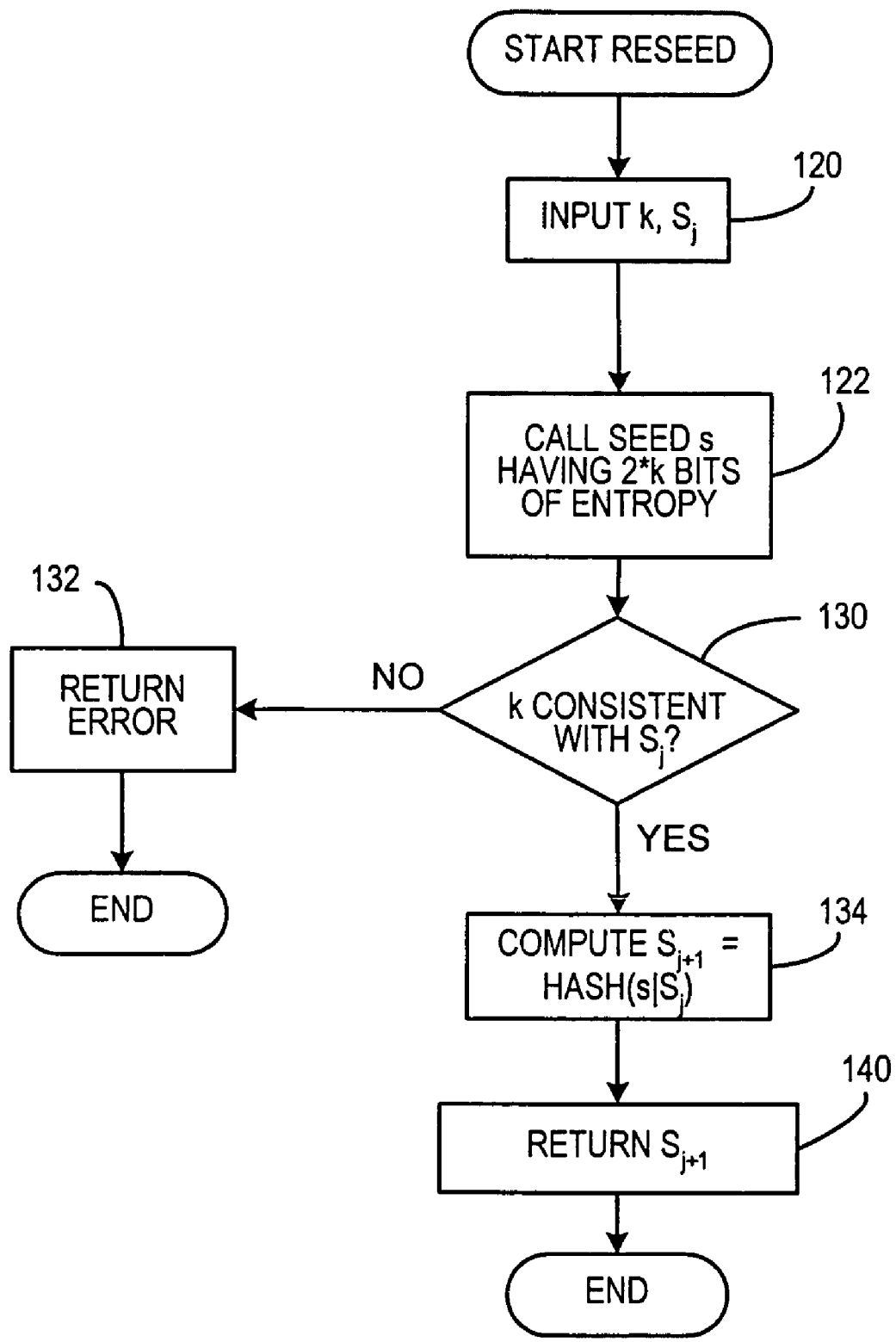

FIGS. 2A, 2B, and 2C show detailed flow diagrams of the operation of DRBG 16 in accordance with a preferred embodiment of the subject invention using a conventional hashing function, hash, to mix a single component state $S_j$. This embodiment is believed to provide degrees of forward and backward security while reducing the computational burden on DRBG 16. A suitable hash is SHA1.

In FIG. 2A, an initialization routine is shown, where at step 50, DRBG 16 inputs security parameter k, which defines the level of security required. At step 52 DRBG 16 calls seed s from entropy source 28; seed s having at least 2*k bits of entropy. At step 54 it inputs constant HASH_DIGESTSIZE, defining the output size for the hash function (typically 2*k bits), from data store 20 as determined by parameter k.

As understood in the art entropy is a mathematical measure of the amount of information provided by observation of the state of a variable. Here the variable seed s is a binary bit string. It is easily shown that if entropy source 18 is flat, i.e. all values of s are equally likely, that observation of the state of s, where s is 2*k bits in length, provides 2*k bits of entropy. However since, in general, entropy sources are not flat, s typically must be more than 2*k bits in length to provide 2*k bits of entropy.

At step 58 an initial state $S_0$ is computed as $S_0=\text{hash}(s)$. At step 62 initial state $S_0$ and HASH_DIGESTSIZE are returned and DRBG 16 exits.

FIG. 2B shows the operation of DRBG 16 in generating requested secret input $y_j$ in accordance with the present hash based embodiment. At step 70 current state $S_j$ is called from a state buffer (not shown) maintained within the key generation system 15. It should be understood that initially, the current state $S_j$ will be the initial state $S_0$. At step 74 DRBG 16 inputs parameter n, which specifies the length of $y_j$. At step 76 it is determined if an optional user input $u_j$ is to be input. If no user input will be provided, then at step 80 a default value of 0 set for $u_j$. If a user input will be provided, then at step 82 user input $u_j$ is input. At step 84, DRBG 16 determines if $u_j$ is 0, and if so at step 88 sets variable V equal to $\text{hash}(S_j)$; otherwise at step 90 it sets $V=\text{hash}(u_j|S_j)$.

In either case, at step 92 the number of cycles, m, needed to compute $y_j$ is computed as:

$$m=\text{ceiling}(n/\text{HASH\_DIGESTSIZE});$$

and an index q is set equal to 1. Then at step 96 variable x is computed as $x=\text{hash}(V)$, and at step 98 variable $w_q$ is set equal to x.

At step 100 variable V is computed as:

$$V=V+1(\text{mod } 2^{HASH\_DIGESTSIZE}).$$

At step 102 index q is set equal to q+1. Then at step 104 index q is tested to determine if it is equal to m+1. If not, DRBG 16 returns to step 96 to recompute variable x and another cycle of $w_q$. Otherwise, at step 108 secret input $y_j$ is computed as $y_j=$the first n bits of $W_1|W_2|\ldots|W_m$; and at step 112 $S_{j+1}$ is computed as a function of V and $y_{j+1}$. For example, $S_{j+1}$ could be computed as $\text{hash}(V+by_{j+1}+1d$, where $b=\{0,1\}$, i.e., b is equal to either 0 or 1, and $d\in[0, \text{mod } 2^{HASH\_DIGESTSIZE}]$, i.e., d is an element of the set from 0 to mod $2^{HASH\_DIGESTSIZE}$.

At step 114 index j is set equal to j+1; and at step 116 DRBG 16 returns next state $S_{j+1}$, and outputs secret input $y_j$ and exits.

In FIG. 2C a reseed routine is shown in accordance with the present embodiment. In FIG. 2C, at step 120, DRBG 16 inputs security parameter k, which defines the level of security required, and current state $S_j$ from the state buffer of the key generation system 15.

At step 122 DRBG 16 calls seed s from entropy source 28; seed s having at least 2*k bits of entropy. At step 130 it determines if the input value for k is consistent with state $S_j$. If not at step 132 it returns an appropriate error message and exits. At step 134 $S_{j+1}$ is computed as:

$$S_{j+1} = \text{hash}(s|S_j).$$

At step 140 reseeded state $S_{j+1}$ is returned and DRBG16 exits.

The embodiments described above and illustrated in the attached drawings have been given by way of example and illustration only. From the teachings of the present application those skilled in the art will readily recognize numerous other embodiments in accordance with the subject invention. Accordingly, limitations on the subject invention are to be found only in the claims set forth below.

What is claimed is:

1. A method for cryptograghically securing a message comprising:

inputting a seed from an entropy source;
generating an initial state $S_j$ as a function of said seed;
generating a next state $S_{j+1}$ and an output string $y_j$ by:
defining a length n for said output string $y_j$, and a parameter HASH_DIGESTSIZE;
setting an integer value m equal to the smallest integer greater than length n divided by HASH_DIGESTSIZE;
if a user input $u_j$ is supplied, computing a variable V as a hash($u_j|S_j$), otherwise if a user input $u_j$ is not supplied, computing said variable V as a hash($S_j$);
setting an index q equal to 1;
computing a variable x as a hash function x=hash(V);
setting a variable $w_q$ equal to said variable x;
computing said variable V as a function V=V+1(mod $2^{HASH\_DIGESTSIZE}$);
setting said index q equal to q+1;
determining if said index q is equal to m+1, and if not, recomputing the variable x as a hash function x=hash(V) and repeating the setting of variable $W_q$, computing said variable V, and setting said index q equal to q+1;
when said index q is equal to m+1, computing said output string $y_j$ as n predetermined bits of a concatenation of variables $W_q$, where q equals 1 to m;
computing a next state $S_{j+1}$ as a function (f) of V and $y_{j+1}$;
providing said output string $y_j$ for use as a cryptographic key;
inputting said cryptographic key and said message to a cryptographic engine; and
using said cryptographic key in said cryptographic engine to cryptographically secure said message.

2. The method of claim 1, wherein said initial state is generated by mixing said seed with itself.

3. The method of claim 2, wherein said seed is mixed using a hash function.

4. The method of claim 1, wherein said function (f)=hash(V+b$y_{j+1}$+1d), wherein b={0, 1} and d∈[0, mod $2^{HASH\_DIGESTSIZE}$].

\* \* \* \* \*